United States Patent
Duan et al.

(10) Patent No.: US 10,455,816 B2
(45) Date of Patent: Oct. 29, 2019

(54) SENSOR BASED ACTIVITY MONITOR

(71) Applicant: International Business Machines Corporation, Armonk, NY (US)

(72) Inventors: Ning Duan, Beijing (CN); Guoqiang Hu, Shanghai (CN); Jingchang Huang, Shanghai (CN); Peng Ji, Nanjing (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/214,606

(22) Filed: Jul. 20, 2016

(65) Prior Publication Data

US 2018/0020643 A1    Jan. 25, 2018

(51) Int. Cl.
  *G08B 23/00*   (2006.01)
  *A01K 29/00*   (2006.01)
  *G06K 7/10*    (2006.01)

(52) U.S. Cl.
  CPC ........ *A01K 29/005* (2013.01); *G06K 7/10366* (2013.01)

(58) Field of Classification Search
  CPC .................. A01K 29/005; G06K 7/10366
  See application file for complete search history.

(56) References Cited

U.S. PATENT DOCUMENTS

| | | | | |
|---|---|---|---|---|
| 5,778,309 A * | 7/1998 | Tuttle | ................ | H04W 52/50 340/10.34 |
| 6,571,193 B1 * | 5/2003 | Unuma | ................ | A43B 3/0005 340/853.2 |
| 6,588,274 B1 * | 7/2003 | Kumada | ................ | G01C 19/56 73/1.77 |
| 6,892,052 B2 * | 5/2005 | Kotola | ................ | G06Q 20/20 455/41.2 |
| 8,807,443 B2 | 8/2014 | Kennett et al. | | |
| 8,816,864 B2 * | 8/2014 | Menachem | ................ | G01S 5/12 340/10.33 |

(Continued)

FOREIGN PATENT DOCUMENTS

WO   2011051693 A1   5/2011

OTHER PUBLICATIONS

Technical Note—Accuracy of an Ear Tag Attached Accelerometer to Monitor Rumination and Feeding Behavior in Feedlot Cattle, Jun. 25, 2015, pp. 3164-3168.*

(Continued)

*Primary Examiner* — Quang Pham
(74) *Attorney, Agent, or Firm* — Scully, Scott, Murphy & Presser, P.C.; Grant Johnson, Esq.

(57) ABSTRACT

An apparatus or a method for detecting activity quantity of an object includes a sense unit, a count unit, a trigger unit, and a radio circuit. The sense unit senses movements of the object, and generates a sensing signal based on the sensed movements. The count unit receives the sensing signal from the sense unit, counts a number of the movements from the sensing signal, and generates a movement number signal including the number of the movements. The trigger unit generates a trigger signal based on whether one or more trigger conditions are satisfied. The radio circuit is triggered in response to the trigger signal, to generate an activity quantity signal based on the movement number signal and ID information corresponding to the object.

17 Claims, 11 Drawing Sheets

(56) References Cited

U.S. PATENT DOCUMENTS

| | | | |
|---|---|---|---|
| 9,202,193 B2 | 12/2015 | Kwak | |
| 2002/0010390 A1* | 1/2002 | Guice | A01K 11/008 600/300 |
| 2005/0030160 A1* | 2/2005 | Goren | G06K 7/0008 340/10.5 |
| 2006/0068750 A1* | 3/2006 | Burr | H04W 52/0225 455/343.1 |
| 2007/0222610 A1* | 9/2007 | Tagato | G06K 19/07336 340/572.7 |
| 2008/0139970 A1* | 6/2008 | Macomber | A61F 2/60 600/595 |
| 2009/0047645 A1* | 2/2009 | Dibenedetto | G16H 15/00 434/258 |
| 2010/0198034 A1* | 8/2010 | Thomas | A61B 5/14532 600/365 |
| 2010/0302004 A1* | 12/2010 | Winstead | A01K 29/005 340/7.32 |
| 2011/0148639 A1* | 6/2011 | Geissler | A01K 11/004 340/573.1 |
| 2013/0138389 A1* | 5/2013 | Gyongy | A61B 5/1118 702/141 |
| 2013/0204545 A1* | 8/2013 | Solinsky | G01P 13/00 702/44 |
| 2013/0222141 A1 | 8/2013 | Rhee et al. | |
| 2014/0182170 A1* | 7/2014 | Wawrousek | A43B 7/14 36/103 |
| 2014/0275824 A1 | 9/2014 | Couse | |
| 2014/0338447 A1 | 11/2014 | Sharpe et al. | |
| 2014/0352632 A1* | 12/2014 | McLaughlin | A01K 11/008 119/721 |
| 2015/0100141 A1* | 4/2015 | Hughes | A61B 5/1118 700/92 |
| 2015/0202057 A1* | 7/2015 | Zahedi | A61F 2/64 623/26 |
| 2015/0282457 A1* | 10/2015 | Yarden | A01K 29/005 340/573.2 |
| 2015/0351885 A1* | 12/2015 | Kool | A61D 17/002 600/551 |
| 2016/0161281 A1* | 6/2016 | Schuijers | G01C 22/006 702/160 |
| 2016/0165851 A1* | 6/2016 | Harty | A61B 5/0022 600/595 |
| 2016/0353709 A1* | 12/2016 | Van Dijk | A01K 29/005 |
| 2017/0202180 A1* | 7/2017 | Yang | A01K 29/005 |
| 2017/0208780 A1* | 7/2017 | Collins | A01K 53/00 |
| 2017/0348452 A1* | 12/2017 | Kuzelka | A61B 90/98 |

OTHER PUBLICATIONS

Electronic Tutorials, Op-amp Comparator and the Op-amp Comparator Circuit, May 2016.*

Toshiki Iso and Kenichi Yamazaki, Gait Analyzer based on a Cell Phone with a Single Threeaxis Accelerometer, Sep. 12-15, 2006, pp. 141-144.*

Su, Y., et al., "Investigating Sensor Data Retrieval Schemes for Multi-Sensor Passive RFID Tags" 2015 IEEE International Conference on RFID (RFID), Apr. 2015, 8 pages.

Wolfger, B., et al., "Technical note: Accuracy of an ear tag-attached accelerometer to monitor rumin68ation and feeding behavior in feedlot cattle" Journal of Animal Science, Jun. 25, 2015, pp. 3164-3168.

Kapun et al., "Test of a UHF-RFID system for health monitoring of finishing pigs", CIGR-AgEng conference, Jun. 26-29, 2016, Aarhus, Denmark, https://www.researchgate.net/profile/Anita_Kapun/publication/304246730_Test_of_a_UHF-RFID_system_for_health_monitoring_of_finishing_pigs/links/576a559308ae12d112901f21.pdf, pp. 1-6.

Ariff et al., "RFID based systematic livestock health management system", 2014 IEEE Conference on Systems, Process and Control (ICSPC 2014), Kuala Lumpur, 2014, pp. 111-116, doi: 10.1109/SPC.2014.7086240.

* cited by examiner

SENSOR BASED ACTIVITY MONITOR

FIELD

The present disclosure generally relates to an animal's activity quantity, and more particularly, to a self-triggered apparatus of detecting activity quantity of an animal and a method for operating the apparatus.

BACKGROUND

Activity quantity is an important index for animals. A high level of activity quantity may be exhibited by animals who live in a good environment and has a healthy body. However, the activity quantity may suddenly be degraded when the animals become sick.

Monitoring the activity quantity of animals, may create enormous values. For example, food consumers may care about an animals' such as livestocks activity quantity as they may be willing to spend more money for the meat with higher activity quantity; farmers may use the metric of activity quantity to prevent epidemic, and third party food safety institutes pay more and more attentions to this index.

Thus, a method of collecting the activity quantity automatically and quickly with a low-cost solution for large-scale application is needed.

SUMMARY

In one aspect, there is provided an apparatus for detecting activity quantity of an object. The apparatus includes a sense unit, a count unit, a trigger unit, and a radio unit. The sense unit is configured to sense movements of the object, and to generate a sensing signal based on the sensed movements. The count unit is configured to receive the sensing signal from the sense unit, to count a number of the movements from the sensing signal, and to generate a movement number signal including the number of the movements. The trigger unit is configured to generate a trigger signal in response to determination that one or more trigger conditions are satisfied. The radio circuit is configured to be triggered in response to the trigger signal, to generate an activity quantity signal based on the movement number signal and ID information corresponding to the object, and to transmit the activity quantity signal over a communication network.

In another aspect, there is provided a method for detecting activity quantity of an object. The method includes sensing movements of the object, generating a sensing signal based on the sensed movements, counting a number of the movements from the sensing signal to generate a movement number signal including the number of the movements, generating a trigger signal in response to determination that one or more trigger conditions are satisfied, generating an activity quantity signal, in response to the trigger signal, based on the movement number signal and ID information corresponding to the object, and transmitting the activity quantity signal over a communication network.

Further, in another aspect, there is provided a computer program product for a method for detecting activity movements of an object. The computer program product is stored in a non-transitory computer-readable storage medium having computer readable program instructions. The computer readable program instructions are read and carried out by a processing device. The method includes sensing movements of the object, generating a sensing signal based on the sensed movements, counting a number of the movements from the sensing signal to generate a movement number signal including the number of the movements, generating a trigger signal in response to determination that one or more trigger conditions are satisfied, generating an activity quantity signal, in response to the trigger signal, based on the movement number signal and ID information corresponding to the object, and transmitting the activity quantity signal over a communication network.

DETAILED DESCRIPTION OF THE EMBODIMENTS

Figure 1:
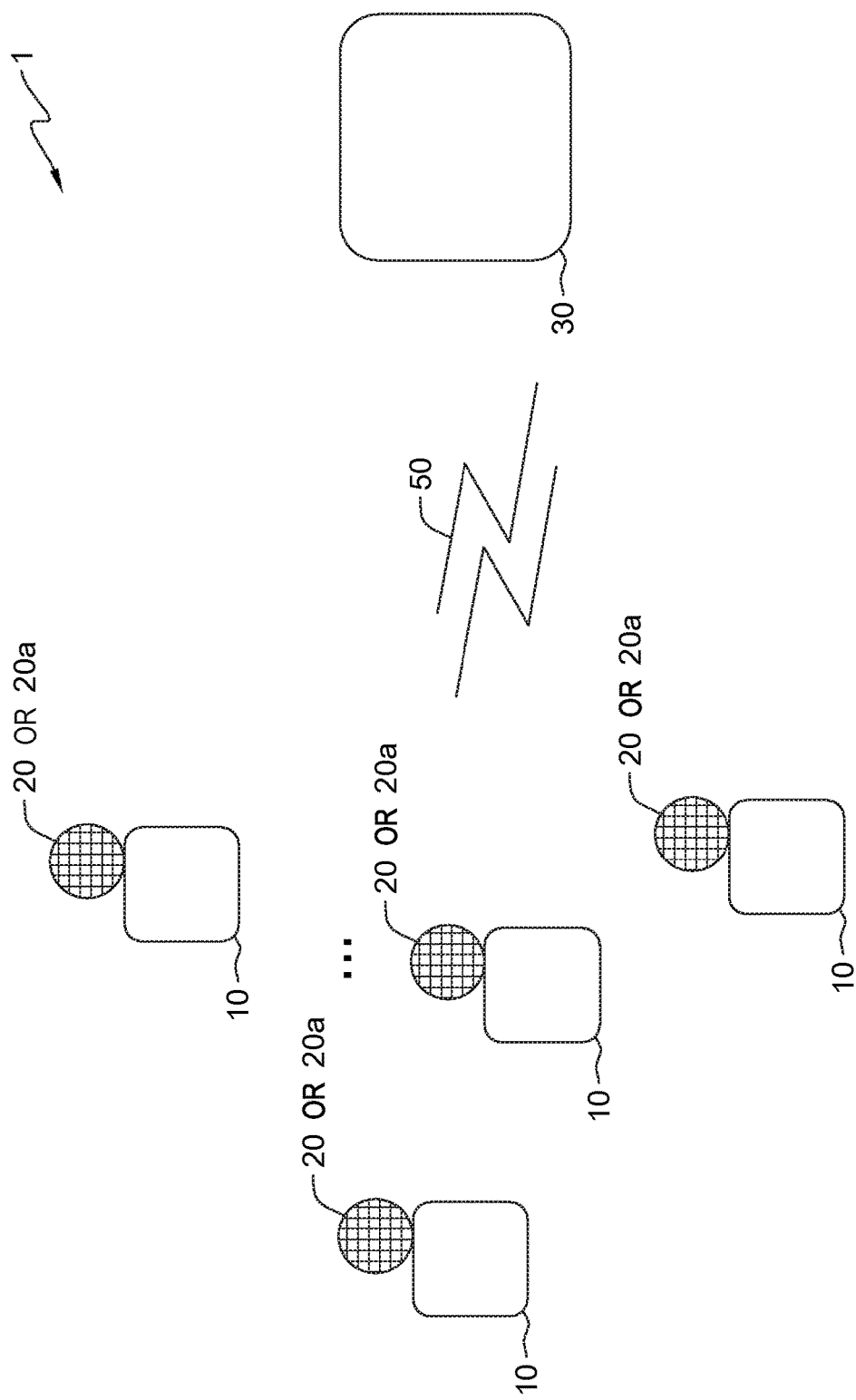
FIG. 1 illustrates a conceptual diagram of a self-triggered system of collecting activity quantity of an object under monitoring (OUM) according to a non-limiting exemplary embodiment of the present disclosure.

Hereinafter, the present inventive concept will be described in detail with reference to the accompanying drawings. In the drawings, the size and relative sizes of layers and regions may be exaggerated for clarity. All the units throughout the specification and drawings may be circuits. Like reference numerals may refer to like elements throughout the written descriptions and drawings.

FIG. 1 illustrates a conceptual diagram of a self-triggered system 1 of collecting activity quantity of an object under monitoring (OUM) according to a non-limiting exemplary embodiment of the present disclosure.

Referring to FIG. 1, the system 1 may include a plurality of objects under monitoring (OUMs), a plurality of activity quantity collecting devices, and a receiving device 30. Hereinafter, each of the OUMs is collectively referred to as a reference numeral 10, and each of the activity quantity collecting device is collectively referred to as a reference numeral 20 or 20a. Each OUM 10 may be a subject to be monitored in terms of activity such as movements, steps, etc. Each activity quantity collecting device 20 or 20a may be attached to a corresponding one of the OUM 10 for collecting activities thereof. For example, the OUM 10 may include, but not limited to, a human, an animal, a livestock, etc. Each activity quantity collecting device 20 or 20a may sense the activities of the corresponding OUM 10 and transmit the sensed activity data to the receiving device 30 over a wireless communication network 50. The receiving device 30 may receive the sensed activity quantity data from the activity quantity collecting device 20 or 20a, and transmit the sensed activity quantity data to an external system (not shown) for additional processing.

The network 50 may be implemented using on a wireless communication technique based on radio-frequency identification (RFID), code division multiple access (CDMA), global system for mobile communication (GSM), wideband CDMA, CDMA-2000, time division multiple access (TDMA), long term evolution (LTE), wireless LAN, Bluetooth, or the like. Each of the activity quantity collecting device 20 or 20a and the receiving device 30 may respectively include a transmitting unit and a receiving unit which support at least one of the above-mentioned communication techniques. In one embodiment, the OUM 10 may include an RFID tag, and the receiving device 30 may include an RFID reader.

Figure 2:
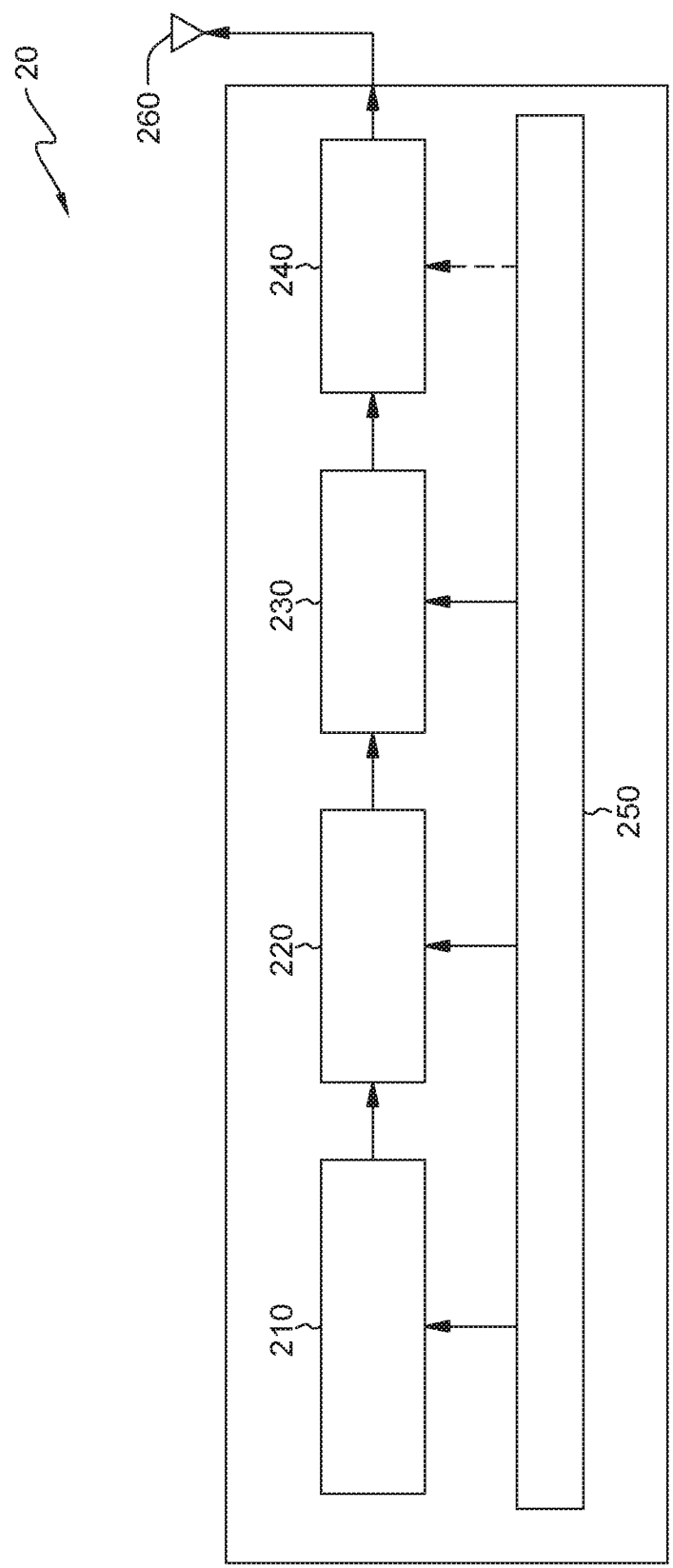
FIG. 2 illustrates a block diagram of an activity quantity collecting device according to a non-limiting exemplary embodiment of the present disclosure.

FIG. 2 illustrates a block diagram of an activity quantity collecting device 20 according to a non-limiting exemplary embodiment of the present disclosure.

Referring to FIG. 2, the activity quantity collecting device 20 may include a sense unit 210, a movement count unit 220, a trigger unit 230, a radio unit 240, a power source unit 250, and an antenna unit 260. The power source unit 250 may provide power to each of the sense unit 210, the movement count unit 220, the trigger unit 230, and the radio unit 240. The sense unit 210 may sense movements of an OUM and generate a sensing signal based the sensed movements of the OUM. The movement count unit 220 may receive the sensing signal from the sense unit 210 and generate a movement number signal based on the sensing signal. The trigger unit 230 may receive the movement number signal and generate a trigger signal based on at least the movement number signal. The radio unit 240 may receive the movement number signal as a baseband signal and generate a radio-frequency (RF) modulated signal in response to the trigger signal, to be transmitted through the antenna unit 260. In one embodiment, the "movement" of an OUM may include a step taken by the OUM, and, in this case, the term "movement" can be replaced by a term "step". For example, the "movement count unit 220" and "movement number signal" may be replaced by a "step count unit" and a "step number signal", respectively.

Figure 3:
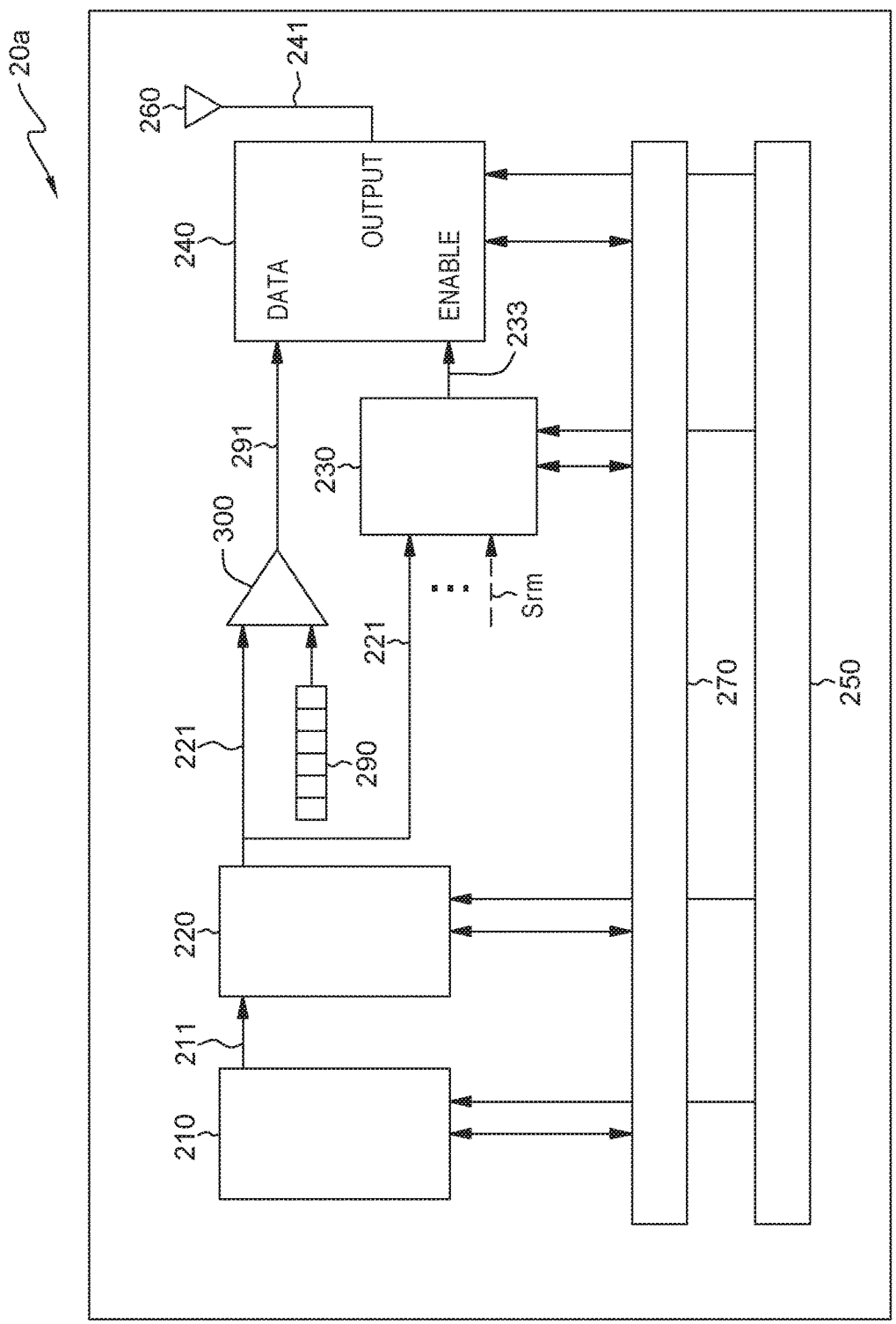
FIG. 3 illustrates a block diagram of an activity quantity collecting device according to a further non-limiting exemplary embodiment of the present disclosure.

FIG. 3 illustrates a block diagram of an activity quantity collecting device 20a according to a further non-limiting exemplary embodiment of the present disclosure.

Referring to FIG. 3, the activity quantity collecting device 20a may include a sense unit 210, a movement count unit 220, a trigger unit 230, a radio unit 240, a power source unit 250, and an antenna unit 260. The power source unit 250 may provide power to each of the sense unit 210, the movement count unit 220, the trigger unit 230, the radio unit 240, and the control unit 270. In one embodiment, the activity quantity collecting device 20a may further include a control unit 270 with a processor (not shown) configured to control operations of the sense unit 210, the movement count unit 220, the trigger unit 230, the radio unit 240, and the power source unit 250. The sense unit 210 may be configured to sense movements of an OUM, and generate a sensing signal 211 based the sensed movements of the OUM. The sensing signal 211 may be provided to the movement count unit 220.

The sense unit 210 may include one or more acceleration sensors for sensing movements of one or more OUMs. Thus, the sensing signal 211 may include an acceleration signal corresponding the movements of the OUMs.

The movement count unit 220 may be configured to receive the sense signal 211 from the sense unit 210, to analyze the sensing signal 211, to count (or calculate) as to how many movements, for a given time period, are included in the sensing signal 211, and to output the counted number of movements as a movement number signal 221. The movement number signal 221 may be provided to the radio unit 240 and to the trigger unit 230. When the movement number signal 221 is provided to the radio unit 240, identification (ID) information 290 pertaining to a corresponding OUM with which the movement number signal 221 is associated may be attached to or included automatically in the movement number signal 221 through an ID write unit 300. Although it is illustrated in FIG. 3 that the ID write unit 300 is implemented outside the movement count unit 220 and the trigger unit 230, exemplary embodiments of the present disclosure are not limited thereto, and for example, the ID write unit 300 or its function may be implemented in the movement count unit 220 or the trigger unit 230. A signal Srm input to the trigger unit 230 may be an elapsed time signal provided from a timer 234. This will be described in detail with reference to FIG. 6.

In one embodiment, the ID write unit 300 may generate a signal 291 including the movement number signal 221 and its corresponding ID information 290, and provide the signal 291 to the radio unit 240. In addition, the trigger unit 230 may generate a trigger signal 233 based on at least the movement number signal 221 to provide the generated trigger signal 233 to the radio unit 240. The trigger signal 233 may be generated when one or more trigger conditions (or rules) are satisfied. The one or more trigger conditions include a condition associated with the number of movements, which is included in the movement number signal 221, counted by the movement count unit 220. Another condition other than the condition associated with the number of movements may be used to determine the generation of the trigger signal 233.

The radio unit 240 may receive the signal 291 as a baseband signal and modulate the signal 291 to generate an activity quantity signal 241, and output the generated activity quantity signal 241 using the antenna unit 260 to the receiving device 30 over the wireless communication network 50. The activity quantity signal 241 may be a signal obtained by modulating the signal 291 to generate a radio frequency signal adapted for transmission over the wireless communication network 50. Further, the activity quantity signal 241 may include the movement number signal 221 pertaining to activity quantity of the corresponding OUM and the ID information 290 pertaining to the OUM. The radio unit 240 may be triggered, by the trigger signal 232, to generate or transmit the activity quantity signal 241. In one embodiment, the radio unit 240 may be powered on only when the activity quantity signal 241 is generated or transmitted in response to the trigger signal 232, and thus, power consumption of the radio unit 240 or the overall activity quantity collecting device 20a or 20 may be reduced accordingly.

Figure 4A:
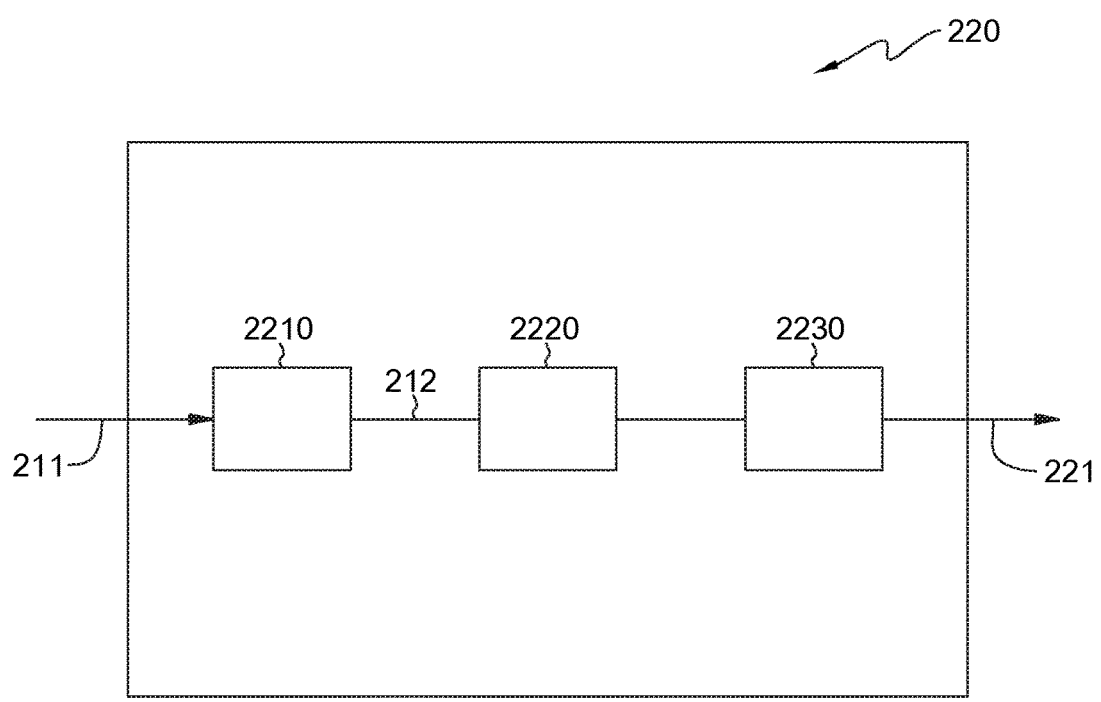
FIG. 4A illustrates a block diagram of a movement count unit according to a non-limiting exemplary embodiment of the present disclosure.
Figure 4B:
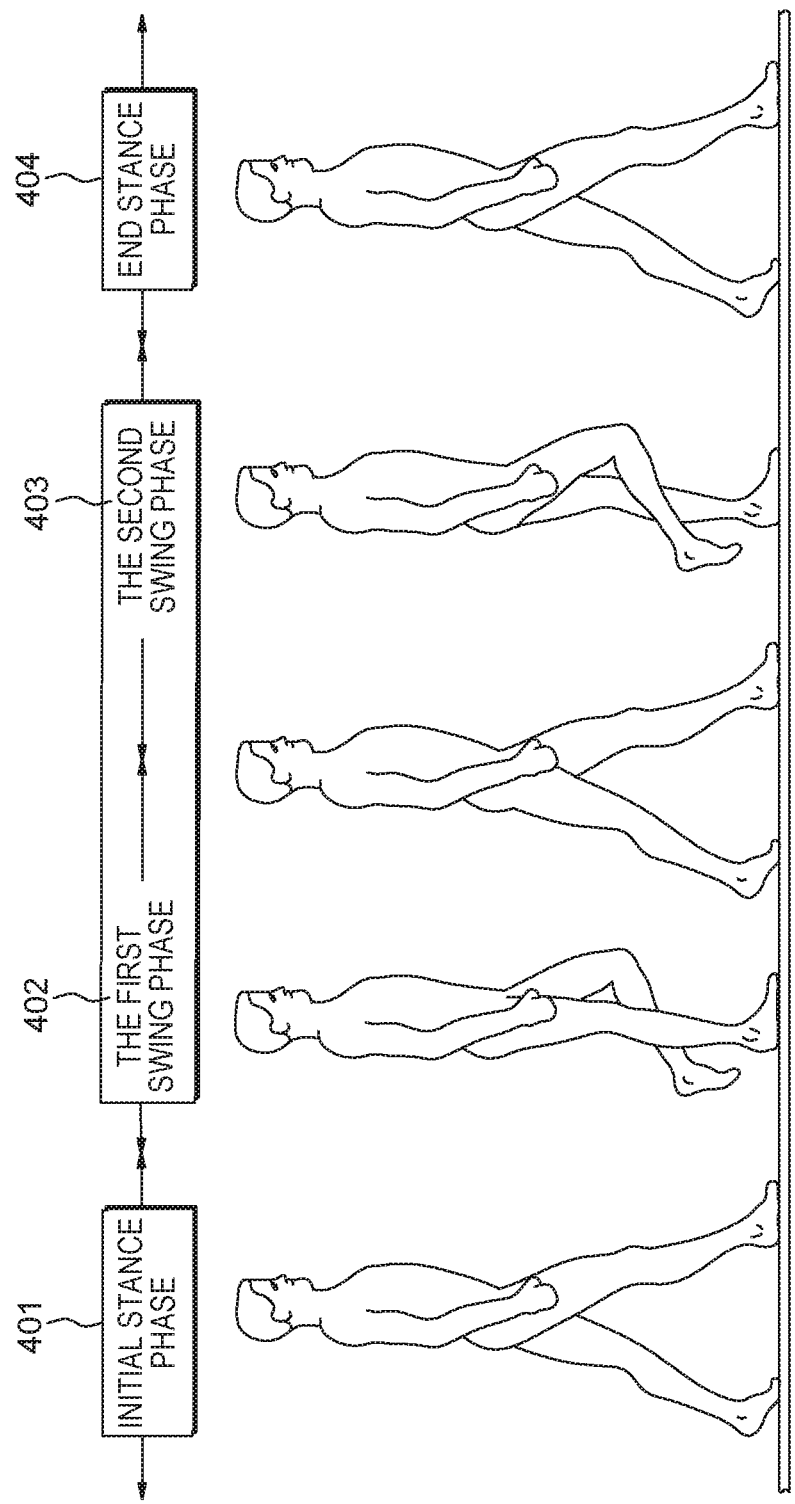
FIG. 4B illustrates an example of a pedestrian model according to a non-limiting exemplary embodiment of the present disclosure.

FIG. 4A illustrates a block diagram of a movement count unit 220 according to a non-limiting exemplary embodiment of the present disclosure. FIG. 4B illustrates a block diagram of a signal level comparator 2210 according to a non-limiting exemplary embodiment of the present disclosure.

Referring to FIG. 4A, the movement count unit 220 may include a signal level comparator 2210, a state machine 2220, a counter 2230. The sensing signal 211 may be input to the signal level comparator 2210. The signal level comparator 2210 may output a sensing signal 212 with a level exceeding a threshold value to the state machine 2220. The state machine 2220 may capture an event and the counter 2230 may count the number of movements by adding the captured event to an accumulated movement number.

Movement (or step) count algorithm may be used to calculate how many movements (or steps) are included in the sensing signal 211. An event corresponding to the movement (or step) may be recognized by combining acceleration data included in the sensing signal 211 and a pedestrian model. In one embodiment of the pedestrian model, each gait cycle may include an initial stance phase 401, a first swing phase 402, a second swing phase 403, and an end stance 404, as shown in FIG. 4B.

Figure 4C:
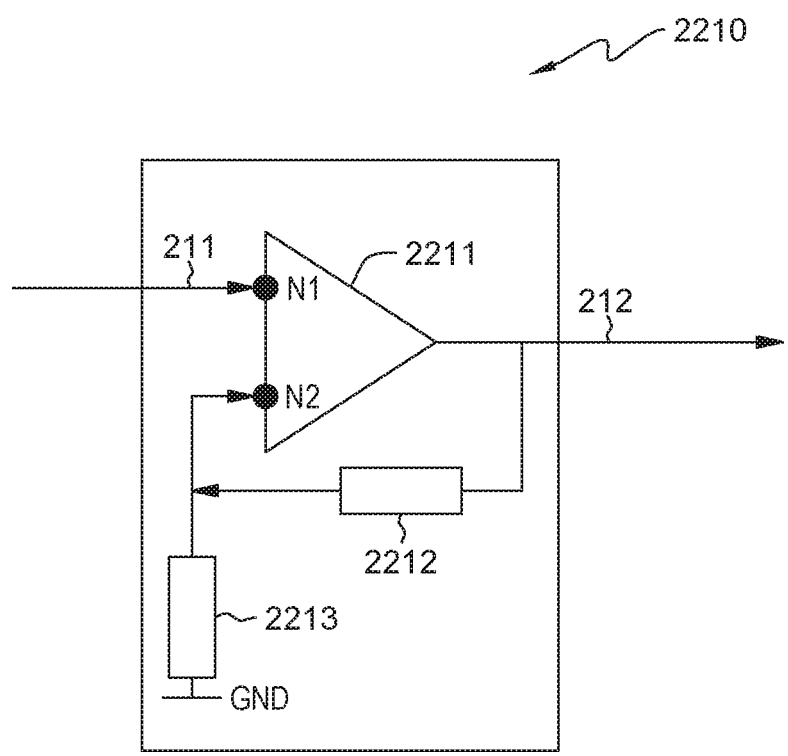
FIG. 4C illustrates a block diagram of a signal level comparator of a movement count unit according to a non-limiting exemplary embodiment of the present disclosure.

In one embodiment, referring to FIG. 4C, the signal level comparator 2210 may be implemented with a differential amplifier 2211, and resistors 2212 and 2213 for feedbacking an output voltage of the differential amplifier 2211 to a negative input N2 thereof. The resistor 2212 may be connected between an output node of the differential amplifier 2211 and the node N2, and the resistor 2213 may be connected between the node N2 and a ground GND. The sensing signal 211 may be input to a positive input N1 of the differential amplifier 2211. A threshold value of the signal level comparator 2210 may be determined using a ratio of the resistors 2212 and 2213.

Figure 5A:
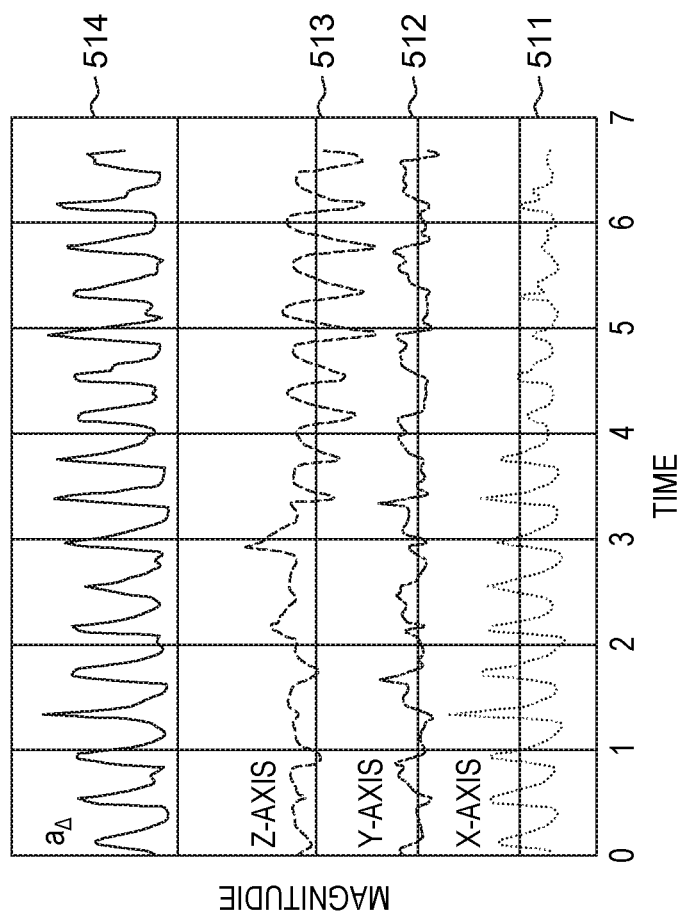
FIGS. 5A and 5B each illustrate an example of a sensing signal according to a non-limiting exemplary embodiment of the present disclosure.

FIG. 5A illustrates an example of a sensing signal 211 according to a non-limiting exemplary embodiment of the present disclosure. As described above, the sensing signal 211 may be acceleration signals sensed using the sense unit 210 including at least one acceleration sensor.

Referring to FIG. 5A, the sensing signal 211 may include acceleration signals 511 to 513 respectively sensed with respect to x, y, and z coordinates and an acceleration signal 514 obtained by filtering the x coordinate acceleration signal 511.

Figure 5B:
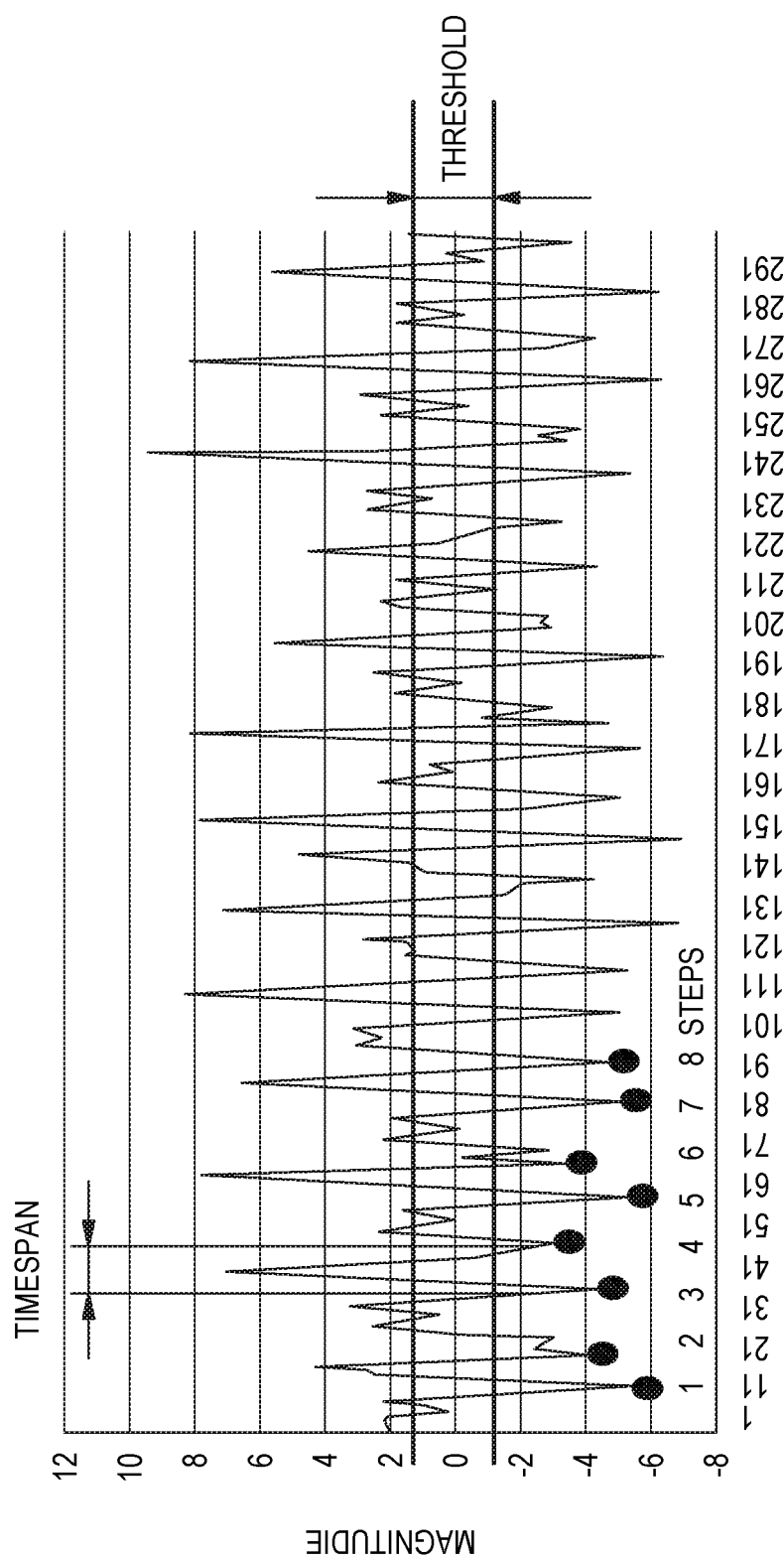

FIG. 5B illustrates an example of a sensing signal 211 provided to a movement count unit 220 according to a non-limiting exemplary embodiment of the present disclosure.

Referring to FIG. 5B, a threshold comparison may be performed on the sensing signal 211 input to the movement count unit 220. The terms "time span" and "threshold" illustrated in FIG. 5B may be referred to as a "transmission time from one movement to another movement" and a "threshold value" applied in the signal level comparator 2210, respectively.

Figure 6:
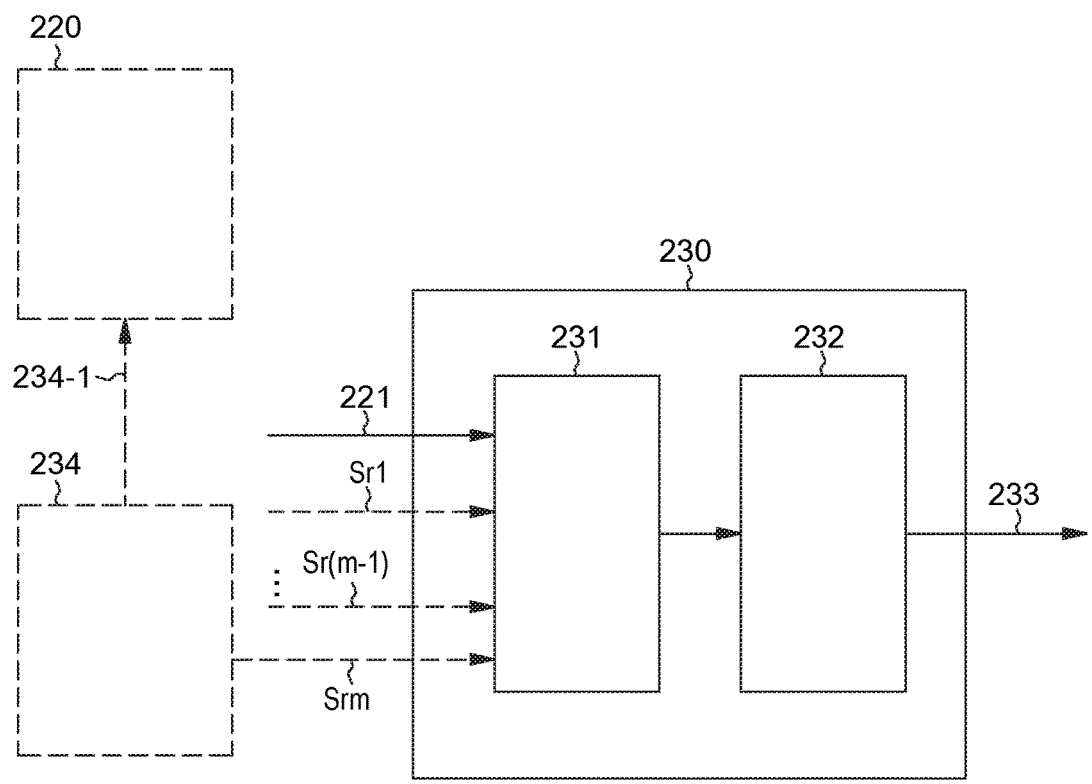
FIG. 6 illustrates a block diagram of a trigger unit according to a non-limiting exemplary embodiment of the present disclosure.

FIG. 6 illustrates a block diagram of a trigger unit 230 according to a non-limiting exemplary embodiment of the present disclosure Referring to FIG. 6, the trigger unit 230 may include a processing unit 231 and a trigger signal generation unit 232. The processing unit 231 may determine a trigger of the radio unit 240 using the one or more trigger conditions to control the trigger signal generation unit 232 for generation of the trigger signal 233.

In one embodiment, the one or more trigger conditions may include a condition which is related to the number of movements included in the movement number signal 221 provided from the movement count unit 220. For example, the processing unit 231 may receive the movement number signal 221 provided from the movement count unit 220. When the number of movements of the movement number signal 221 is equal to or less than a predetermined movement number, the processing unit 231 may determine not to trigger the radio unit 240, thereby controlling the trigger signal generation unit 232 not to generate the trigger signal 233. In addition, when the number of movements of the movement number signal 221 is more than the predetermined movement number, the processing unit 231 may determine to trigger the radio unit 240, thereby controlling the trigger signal generation unit 232 to generate the trigger signal 233.

In one embodiment, the one or more trigger conditions may further include a condition which is related to an elapsed time. For example, referring to FIG. 6, the processing unit 231 may receive an elapsed time signal Srm provided from a timer 234. When the elapsed time of the elapsed time signal Srm is equal to or less than a predetermined time, the processing unit 231 may determine not to trigger the radio unit 240, thereby controlling the trigger signal generation unit 232 not to generate the trigger signal 233. In addition, when the elapsed time of the elapsed time signal Srm is more than the predetermined time, the processing unit 231 may determine to trigger the radio unit 240, thereby controlling the trigger signal generation unit 232 to generate the trigger signal 233. The timer 234 may be in synchronization with the movement count unit 220 through a connection 234-1.

However, examples of the one or more trigger conditions of the present disclosure are not limited thereto. For example, the processing unit 231 may further receive one or more signals Sr1 to Sr(m−1) which are related to the trigger conditions, and determine whether to trigger the radio unit 240 using the one or more signals Sr1 to Sr(m−1).

In one embodiment, the processing unit 231 may determine to trigger the radio unit 240 when at least one or a predetermined number of the one or more conditions described above are satisfied or when at least one specific condition of the one or more conditions is satisfied.

Generally, data transmission over a communication network may continually consume a lot of resources such as channel bandwidth, storage, power, etc, resulting in redundancy issues.

Since the radio unit 240 of the activity quantity collecting device 20 or 20a according to an embodiment is triggered to be turned on only when the one or more conditions are satisfied, waste of the resources may be minimized or reduced.

In one embodiment, the sense unit 210, the movement count unit 220, the trigger unit 230, the radio unit 240, the power source unit 250, and/or the processing unit 270 may be implemented in a single integrated chip (IC) or in the same pieces of material, and thus, manufacturing cost of the activity quantity collecting device 20 or 20a and power consumption thereof may be minimized or reduced.

Figure 7:
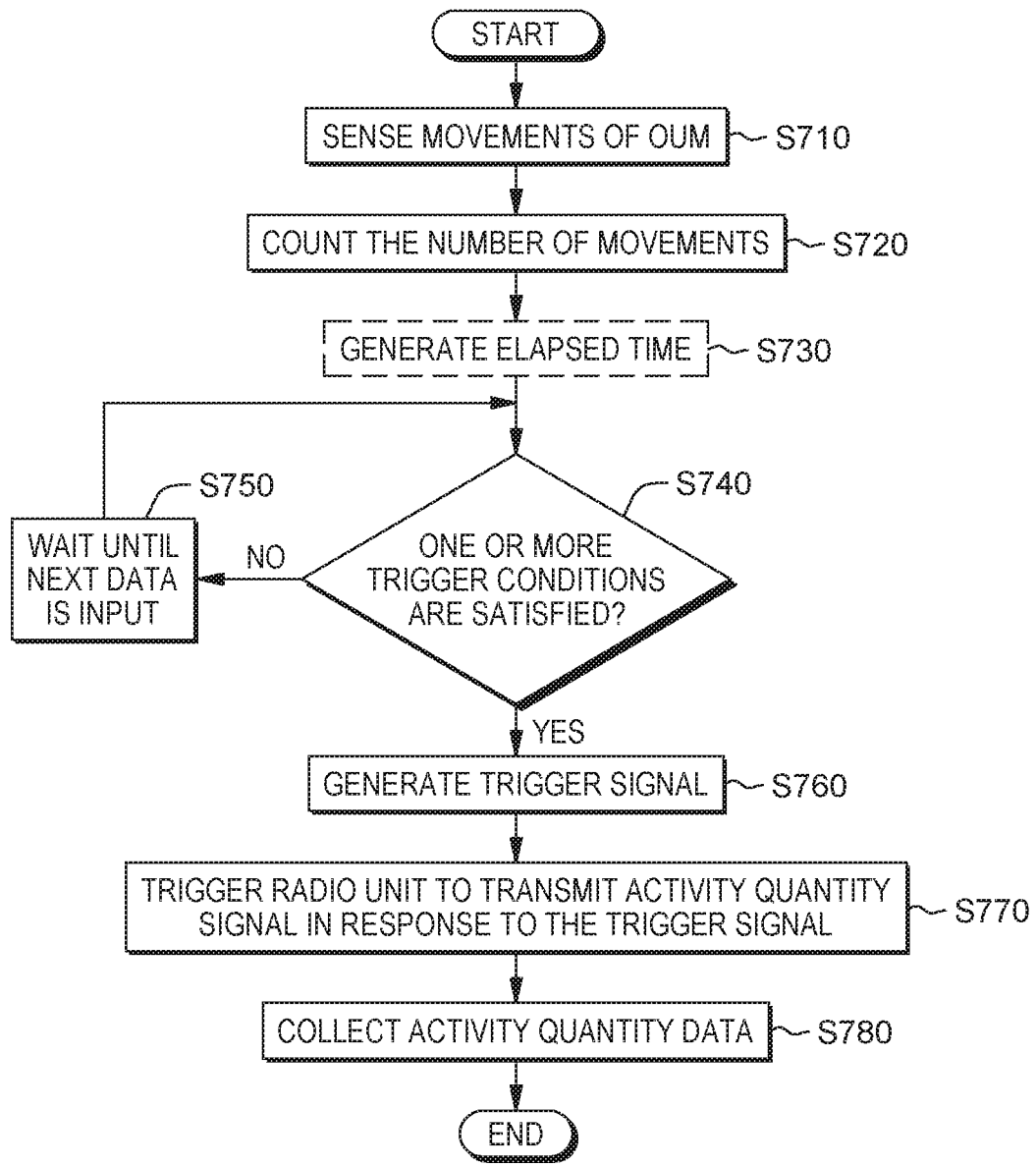
FIG. 7 is a flow chart illustrating a method of collecting activity quantity according to a non-limiting exemplary embodiment of the present disclosure.

FIG. 7 is a flow chart illustrating a method of collecting activity quantity according to a non-limiting exemplary embodiment of the present disclosure.

Referring to FIG. 7, the method for detecting activity quantity of an OUM according to an embodiment may include sensing movements of the OUM using the sense unit 210 to generate a sensing signal 211 in an operation of S710 and counting a number of the movements from the sensing signal 211 using the movement count unit 220 in an operation of S720. The method further include determining whether the one or more trigger conditions are satisfied by comparing at least one of parameter values (e.g., the number of movements or the elapsed time) included in the respective signals 221 and Sr1 to Srm with a corresponding one of predetermined reference values (e.g., the predetermined movement number or the predetermined time) in an operation of S740.

When it is determined that the one or more trigger conditions are satisfied (YES), the trigger signal 233 may be generated using the trigger unit 230 and provided to the radio unit 240 in an operation of S760. The method may further include triggering the radio unit 240 in response to the trigger signal 233, and to transmit the activity quantity signal 241 through the antenna unit 260 to the receiving unit 30 in an operation of S770. Further, activity quantity data of the OUM may be collected from the transmitted activity quantity signal 241 using the receiving device 30 in an operation of S780.

When it is determined that the one or more trigger conditions are not satisfied (NO), the method may further include waiting until next data (e.g., 221 and/or Sr1 to Srm) is input in an operation of S750.

The method may further include generating an elapsed time using the timer 234 in an operation of S730 prior to the operation S740. The generated elapsed time may be related to one of the one or more trigger conditions and may be used for checking whether the corresponding condition is satisfied. In one embodiment, the operation S730 might not be performed.

Figure 8:
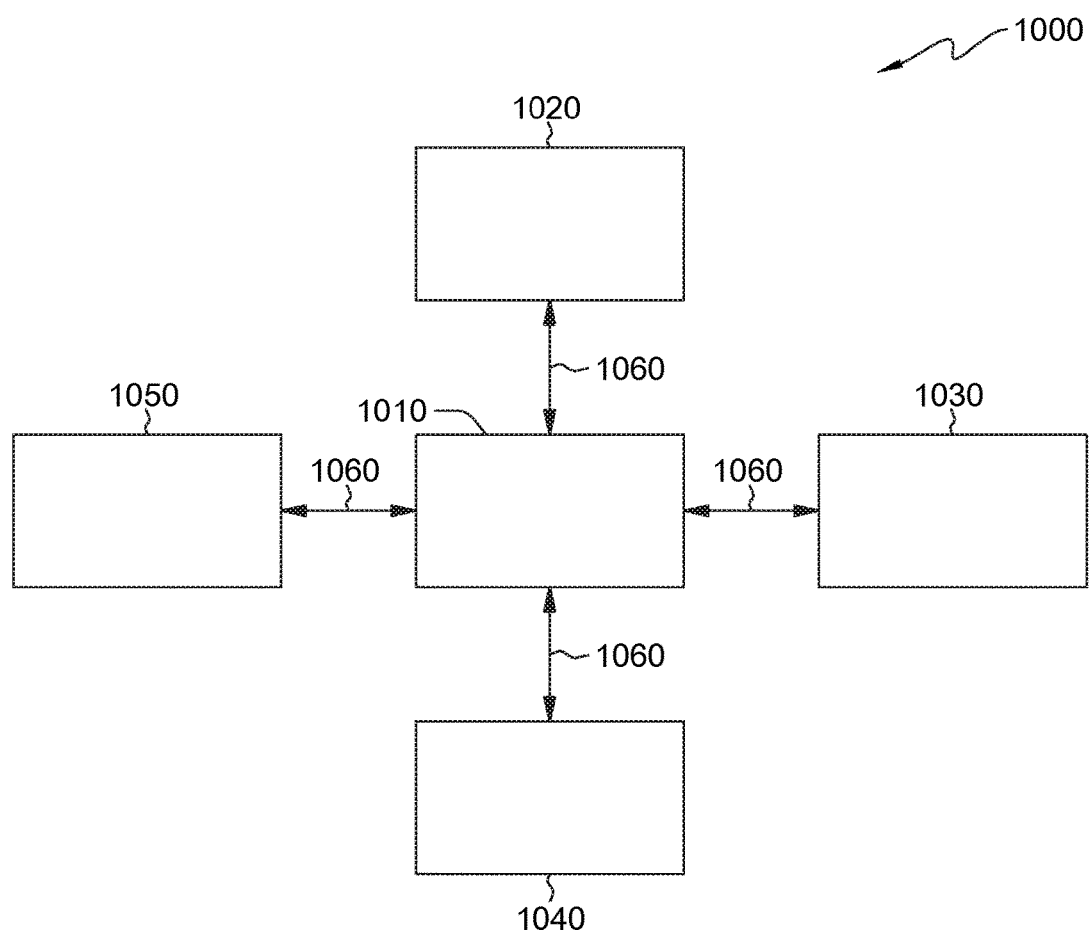
FIG. 8 illustrates a block diagram of a computing system according to a non-limiting exemplary embodiment of the present disclosure.

FIG. 8 illustrates a block diagram of a computing system 1000 according to a non-limiting exemplary embodiment of the present disclosure.

Referring to FIG. 8, the computing system 1000 may be used as a platform for performing the functions or operations described hereinabove with respect to the system 1 of FIG. 1, the activity quantity collecting devices 20 of FIGS. 2 and 20a of FIG. 3, and/or the method of FIG. 7.

In addition, the computing system 1000 may be implemented with a ultra-mobile personal computer (UMPC), a net-book, a personal digital assistance (PDA), a portable computer (PC), a web tablet, a wireless phone, a mobile phone, a smart phone, an e-book, a portable multimedia player (PMP), a portable game console, a navigation device, a black box, a digital camera, a digital multimedia broadcasting (DMB) player, a digital audio recorder, a digital audio player, a digital picture recorder, a digital picture player, a digital video recorder, a digital video player, or the like.

Referring to FIG. 8, the computing system 1000 may include a processor 1010, I/O devices 1020, a memory system 1030, a display device 1040, and a network adaptor 1050.

The processor 1010 may drive the I/O devices 1020, the memory system 1030, the display device 1040, and the network adaptor 1050 through a bus 1060.

The computing system 1000 may include a program module for performing the functions or operations described hereinabove with respect to the system 1 of FIG. 1, the activity quantity collecting devices 20 of FIGS. 2 and 20a of FIG. 3, and/or the method of FIG. 7, according to a non-limiting exemplary embodiment of the present disclosure. For example, the program module may include routines, programs, objects, components, logic, data structures, or the like, for performing particular tasks or implement particular abstract data types. The processor (e.g., 1010) of the computing system 1000 may execute instructions written in the program module to perform the functions or operations described with respect to the system 1 of FIG. 1, the activity quantity collecting devices 20 of FIGS. 2 and 20a of FIG. 3, and/or the method of FIG. 7. The program module may be programmed into the integrated circuits of the processor (e.g., 1010). In an exemplary embodiment, the program module may be stored in the memory system (e.g., 1030) or in a remote computer system storage media.

The computing system 1000 may include a variety of computing system readable media. Such media may be any available media that is accessible by the computer system (e.g., 1000), and it may include both volatile and non-volatile media, removable and non-removable media.

The memory system (e.g., 1030) can include computer system readable media in the form of volatile memory, such as random access memory (RAM) and/or cache memory or others. The computer system (e.g., 1000) may further include other removable/non-removable, volatile/non-volatile computer system storage media.

The computer system (e.g., 1000) can communicate with one or more devices using the network adapter (e.g., 1050). The network adapter may support wired communications based on Internet, local area network (LAN), wide area network (WAN), or the like, or wireless communications based on radio-frequency identification (RFID), code division multiple access (CDMA), global system for mobile communication (GSM), wideband CDMA, CDMA-2000, time division multiple access (TDMA), long term evolution (LTE), wireless LAN, Bluetooth, or the like.

Exemplary embodiments of the present disclosure may include a system, a method, and/or a computer program product. The computer program product may include a non-transitory computer readable storage medium (e.g., the memory system 1030) having computer readable program instructions thereon for causing a processor to carry out aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the computing system 1000 from the computer readable storage medium or to an external computer or external storage device via a network. The network may include copper transmission cables, optical transmission fibers, wireless transmission, routers, firewalls, switches, gateway computers and/or edge servers. A network adapter card (e.g., 1050) or network interface in each computing/processing device receives computer readable program instructions from the network and forwards the computer readable program instructions for storage in a computer readable storage medium within the computing system.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computing system (e.g., 1000) through any type of network, including a LAN or a WAN, or the connection may be made to an external computer (for example, through the Internet using an Internet Service Provider). In an exemplary embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device, and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. An apparatus for detecting activity quantity of an object, comprising:
   a single integrated circuit device having integrated therein:
   a sensor configured to sense one or more movements of the object, and to generate a first sensing signal based on the sensed one or more movements, the first sensing signal having one or more magnitudes corresponding to the sensed one or more movements;

a signal level comparator comprising:
a differential amplifier configured to receive the first sensing signal at a first input node of the differential amplifier and receive a threshold value signal at a second input node of the differential amplifier, said threshold value signal received at said second input node as a feedback signal from an output node of said differential amplifier through a resistor circuit, compare each of the one or more magnitudes of the first sensing signal with the threshold value signal, determine one or more portions of the first sensing signal whose magnitudes exceed the threshold value signal based on a comparison result between each of the one or more magnitudes and the threshold value, and output, through the output node of the differential amplifier, the determined one or more portions of the first sensing signal as a second sensing signal to a state machine implemented by a processor;
the state machine processor capturing one or more events, each captured event corresponding to one of the one or more movements of the object, based on acceleration data included in the second sensing signal;
a counter configured to receive the captured one or more events from the state machine processor, add the received captured one or more events to an accumulated number of movements, and output the accumulated number of the movements to each of a trigger signal generator and a radio transceiver;
the trigger signal generator configured to:
determine whether at least two trigger conditions are satisfied at least based on the accumulated number of the movements received from the counter, a first trigger condition related to the accumulated number of the movements and a second trigger condition related to an elapsed time, said elapsed time being provided by a timer in synchronization with the counter; and
generate a trigger signal in response to determination that the at least two trigger conditions are satisfied; and
output the trigger signal to the radio transceiver, said transceiver being normally in an unpowered off-state;
the radio transceiver configured to:
determine whether the trigger signal is received from the trigger signal generator;
be automatically powered up to an on-state from said off-state in response to determining that the trigger signal is received;
receive the accumulated number of the movements and ID information corresponding to the object;
generate an activity quantity signal based on the accumulated number of the movements and the ID information; and
transmit the activity quantity signal over a communication network;
wherein said capturing of the one or more events further comprises: combining acceleration data included in the first sensing signal and a gait cycle of a pedestrian model to recognize an event corresponding to a movement.

2. The apparatus of claim 1, wherein the sensor includes an acceleration sensor, and the first sensing signal includes an acceleration signal.

3. The apparatus of claim 1, wherein the radio transceiver includes a radio-frequency identification (RFID) tag.

4. The apparatus of claim 1, wherein when the accumulated number of the movements is more than a predetermined number, it is determined that the first condition is satisfied.

5. The apparatus of claim 1, wherein when the elapsed time is more than a predetermined time, it is determined that the second condition is satisfied.

6. The apparatus of claim 1, further comprising: an identification write unit integrated in the single integrated circuit device configured to receive the accumulated number of the movements output and including an identification (ID) information pertaining to the object being monitored with the accumulated number of the movements output.

7. A method for detecting activity quantity of an object, comprising:
sensing, by a sensor integrated in a single integrated circuit device, one or more movements of the object;
generating, by the sensor, a first sensing signal based on the sensed one or more movements, the first sensing signal having one or more magnitudes corresponding to the sensed one or more movements;
receiving, at a first input node of a differential amplifier of a signal level comparator integrated in the single integrated circuit device, the first sensing signal;
receiving, at a second input node of the differential amplifier a threshold value signal, said threshold value signal received at said second input node as a feedback signal from an output node of said differential amplifier through a resistor circuit integrated in the single integrated circuit device;
comparing, by the differential amplifier, each of the one or more magnitudes of the first sensing signal with the threshold value signal;
determining, by the differential amplifier, one or more portions of the first sensing signal whose magnitudes exceed the threshold value based on a comparison result between each of the one or more magnitudes and the threshold value;
outputting, through the output node of the differential amplifier, the determined one or more portions of the first sensing signal as a second sensing signal to a state machine implemented by a processor integrated in the single integrated circuit device;
capturing, by the state machine processor, one or more events, each captured event corresponding to one of the one or more movements of the object, based on acceleration data included in the second sensing signal;
adding, by a counter integrated in the single integrated circuit device, the captured one or more events to an accumulated number of movements;
outputting, by the counter, the accumulated number of the movements to each of a trigger signal generator integrated in the integrated circuit device and to a radio transceiver integrated in the single integrated circuit device;
determining, by the trigger signal generator, whether at least two trigger conditions are satisfied at least based on the accumulated number of the movements received from the counter, a first trigger condition related to the accumulated number of the movements and a second trigger condition related to an elapsed time, said elapsed time being provided by a timer in synchronization with the counter;
generating, by the trigger signal generator, a trigger signal in response to determination that the at least two trigger conditions are satisfied and outputting the trigger signal to the radio transceiver, said transceiver being normally in an unpowered off-state;
determining, by the radio transceiver, whether the trigger signal is received from the trigger signal generator;

automatically powering up the radio transceiver to an on-state from said off-state in response to determining that the trigger signal is received;

receiving, by the radio transceiver, the accumulated number of the movements and ID information corresponding to the object;

generating, by the radio transceiver, an activity quantity signal based on the accumulated number of the movements and the ID information; and transmitting, by the radio transceiver, the activity quantity signal over a communication network;

wherein said capturing of the one or more events further comprises: combining acceleration data included in the first sensing signal and a gait cycle of a pedestrian model to recognize an event corresponding to a movement.

8. The method of claim 7, wherein when the accumulated number of the movements is more than a predetermined number, it is determined that the first condition is satisfied.

9. The method of claim 7,
wherein when the elapsed time is more than a predetermined time, it is determined that the second condition is satisfied.

10. The method of claim 7, wherein the first sensing signal includes an acceleration signal sensed using an acceleration sensor.

11. The method of claim 7, wherein the activity quantity signal is generated using a radio-frequency identification (RFID) tag.

12. The method of claim 7, further comprising: including, by an identification write unit integrated in the single integrated circuit device, an identification (ID) information pertaining to the object being monitored with the output the accumulated number of the movements.

13. A computer program product stored in a non-transitory computer-readable storage medium having computer readable program instructions, the computer readable program instructions read and carried out by a processing device for performing a method for detecting activity quantity of an object, wherein the method comprises:

sensing, using a sensor integrated in a single integrated circuit device, one or more movements of the object;

generating, using the sensor, a first sensing signal based on the sensed one or more movements, the first sensing signal having one or more magnitudes corresponding to the sensed one or more movements;

receiving, at a first input node of a differential amplifier of a signal level comparator integrated in the single integrated circuit device, the first sensing signal;

receiving, at a second input node of the differential amplifier a threshold value signal, said threshold value signal received at said second input node as a feedback signal from an output node of said differential amplifier through a resistor circuit integrated in the single integrated circuit device;

comparing, by the differential amplifier, each of the one or more magnitudes of the first sensing signal with the threshold value signal;

determining, by the differential amplifier, one or more portions of the first sensing signal whose magnitudes exceed the threshold value based on a comparison result between each of the one or more magnitudes and the threshold value;

outputting, through the output node of the differential amplifier, the determined one or more portions of the first sensing signal as a second sensing signal to a state machine implemented by a processor integrated in the single integrated circuit device:

capturing, using the state machine processor, one or more events, each captured event corresponding to one of the one or more movements of the object, based on acceleration data included in the second sensing signal;

adding, using a counter integrated in the single integrated circuit device, the captured one or more events to an accumulated number of movements;

outputting, using the counter, the accumulated number of the movements to each of a trigger signal generator integrated in the single integrated circuit device and a radio transceiver integrated in the single integrated circuit device;

determining, using the trigger signal generator, whether at least two trigger conditions are satisfied at least based on the accumulated number of the movements received from the counter, a first trigger condition related to the accumulated number of the movements and a second trigger condition related to an elapsed time, said elapsed time being provided by a timer in synchronization with the counter;

generating, using the trigger signal generator, a trigger signal for receipt by a radio circuit in response to determination that the at least two trigger conditions are satisfied and outputting the trigger signal to the radio transceiver, said transceiver being normally in an unpowered off-state;

determining, using the radio transceiver, whether the trigger signal is received from the trigger signal generator;

automatically powering up the radio transceiver to an on-state from said off-state powering up the radio transceiver in response to determining that the trigger signal is received;

receiving, using the radio transceiver, the accumulated number of the movements and ID information corresponding to the object:

generating, using the radio transceiver, an activity quantity signal based on the accumulated number of the movements and the ID information; and transmitting, using the radio transceiver, the activity quantity signal over a communication network;

wherein said capturing of one or more events further comprises: combining acceleration data included in the first sensing signal and a gait cycle of a pedestrian model to recognize an event corresponding to a movement.

14. The computer program product of claim 13,
wherein when the number of the movements is more than a predetermined number, it is determined that the first condition is satisfied.

15. The computer program product of claim 13,
wherein when the elapsed time is more than a predetermined time, it is determined that the second condition is satisfied.

16. The computer program product of claim 13, wherein the first sensing signal includes an acceleration signal sensed using an acceleration sensor.

17. The computer program product of claim 13, wherein the activity quantity signal is generated using a radio-frequency identification (RFID) tag.

* * * * *